United States Patent

Fauteux et al.

[11] Patent Number: 5,776,209
[45] Date of Patent: Jul. 7, 1998

[54] ELECTRODE PASTE APPLICATOR PROCESS

[75] Inventors: Denis G. Fauteux, Acton; Martin Van Buren, Chelmsford; Arthur A. Massucco, Natick, all of Mass.

[73] Assignee: Mitsubishi Chemical Corporation, Tokyo, Japan

[21] Appl. No.: 451,911

[22] Filed: May 26, 1995

[51] Int. Cl.$^6$ ............................................. H01M 4/04
[52] U.S. Cl. ..................... 29/623.5; 141/1.1; 141/32
[58] Field of Search ............... 141/1.1, 32; 29/623.5

[56] References Cited

U.S. PATENT DOCUMENTS

| | | | |
|---|---|---|---|
| 1,006,774 | 10/1911 | Morrison | 141/1.1 |
| 4,548,835 | 10/1985 | Takahashi | 141/1.1 X |
| 4,881,944 | 11/1989 | Hammar | 141/1.1 X |
| 5,330,856 | 7/1994 | Gonzalez | 429/212 |

Primary Examiner—John S. Maples
Attorney, Agent, or Firm—Dick and Harris

[57] ABSTRACT

An apparatus and process for applying an electrode paste onto a substrate for use in an electrolytic cell. The apparatus includes a mixing device which mixes, and then dispenses, predetermined amounts of an electrode paste and a polymerization initiator onto a substrate. The mixing device is constructed so as to substantially preclude polymerization of the electrode paste during such mixing, as well as to preclude polymerization prior to application of the mixture onto the substrate.

5 Claims, 2 Drawing Sheets

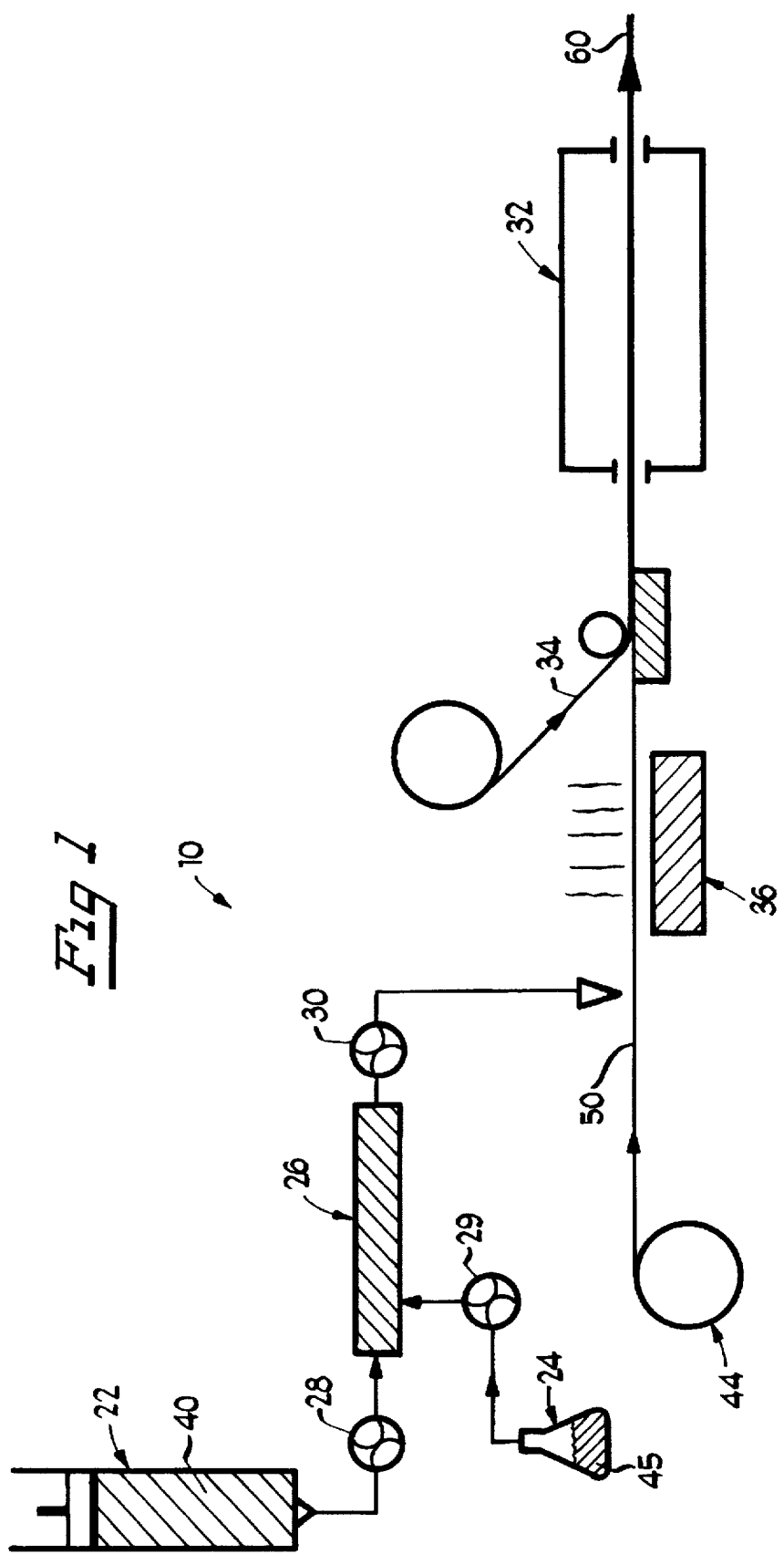

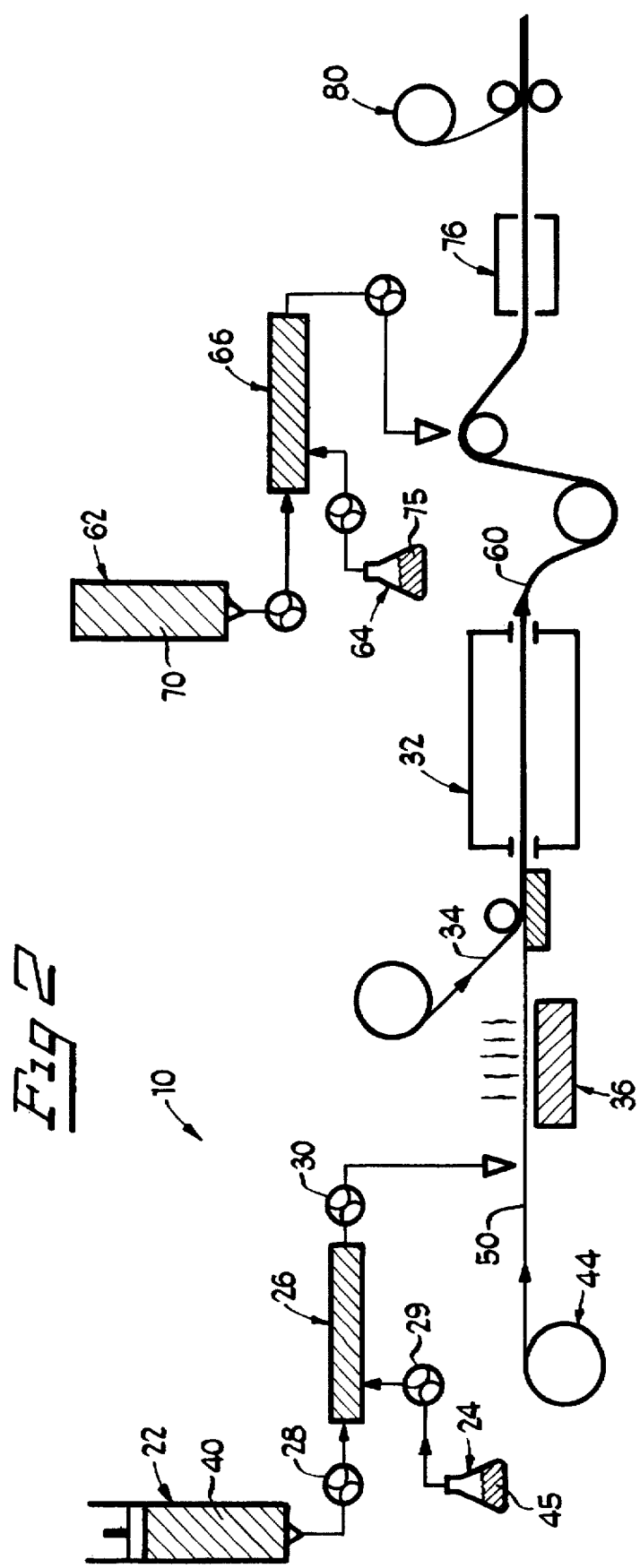

ELECTRODE PASTE APPLICATOR PROCESS

BACKGROUND OF THE INVENTION

1. Field of the Invention

The present invention is directed to an electrode paste applicator apparatus and associated process toward the fabrication of a thermally cured electrode, such as a cathode, for use in an electrolytic cell, and, more particularly, a rechargeable electrolytic cell.

2. Background Art

Electrolytic cells, such as rechargeable lithium batteries, having electrodes/cathodes constructed from a metal foil current collector and an electrode/cathode paste, are well known in the art. Indeed, cathode paste for such applications can be fabricated from various substances using conventional techniques.

Specifically, typical components for such a cathode paste (for use on a metal foil current collector material) based on known desired percentages of use, by weight of the total components, may comprise a cathode active material, carbon black, graphite, plasticizers and acrylic monomers. To actually prepare the cathode paste, the cathode active material, carbon black, graphite and at least some of the plasticizers are mixed together. The actual mixing operation typically lasts between three hours and three days—depending upon the particular mixing/milling technique used, and the particular degree of milling desired.

After completion of the mixing/milling process, the acrylic monomers are gently mixed with the paste, using what is generally known as a double-arm type of closed mixer. However, inasmuch as polymerization inhibitors are generally added to the acrylic monomers by the manufacturers of same (so as to preclude inadvertent polymerization during shipping, storing, handling, etc.), the monomers must be re-treated so as to remove such inhibitors prior to mixing with the paste. Accordingly, since the cathode paste is then prepared using a monomer which is devoid of any polymerization inhibitors, the paste will be quite vulnerable to premature gelation/polymerization if subjected to excessive heat or mechanical energy.

After the cathode paste has been completely prepared, it is then ready to be applied onto a current collector material. Inasmuch as it is desirable to initiate polymerization of the cathode paste immediately after it is applied onto the surface of the current collector, a polymerization initiator may be mixed into the cathode paste either after, or immediately prior to, applying the cathode paste on the current collector material. Unfortunately, while the prior art has disclosed the use of such a polymerization initiator, consistent mixtures, and, in turn, uniform polymerization have been difficult, if not impossible, to achieve. In addition, further problems have been known to occur when the polymerization initiator and cathode paste are mixed prior to applying the cathode paste onto the current collector material. Indeed, such prior art mixing generally results in an excessive transfer of mechanical energy and/or heat to the mixture which, unfortunately, causes premature polymerization and, quite often, damage to the processing equipment—due to gelation within, for example, the mixing device.

It is thus an object of the present invention to provide an electrode paste applicator apparatus and associated process wherein the electrode paste is mixed with a polymerization initiator prior to applying the electrode paste on a substrate/current collector material.

It is also an object of the present invention to provide an electrode paste applicator apparatus and associated process which mixes the electrode paste and polymerization initiator without excessive mechanical energy and/or heat, and, in turn, without excessive transfer of such mechanical energy and/or heat to the components being mixed.

It is still further an object of the present invention to provide an electrode paste applicator apparatus and associated process wherein polymerization of the electrode paste does not occur until after release from the mixing device, and, after the electrode paste has been applied onto the substrate/current collector material.

Another object of the present invention is to provide an electrode paste applicator apparatus and associated process wherein an electrode, for use in an electrolytic cell (such as a rechargeable lithium battery) can be completely fabricated by use of an in-line manufacturing process; which can further include additional in-line apparatus for continuous fabrication and complete assembly of all of the components necessary for such an electrolytic cell.

These and other objects of the present invention will become apparent in light of the present Specification, Claims and Drawing.

SUMMARY OF THE INVENTION

The present invention is directed to an apparatus for applying an electrode paste onto a substrate for use in an electrolytic cell. The apparatus comprises means for releasably supporting an electrode paste and means for releasably retaining a polymerization initiator. Means for mixing a predetermined amount of the electrode paste and polymerization initiator are also included. The mixing means serve to mix, and then release, predetermined amounts of the electrode paste and polymerization initiator onto the substrate. Additionally, means, operatively associated with the mixing means, are used for precluding polymerization of the electrode paste prior to actual release and application of the mixed polymerization initiator and electrode paste onto the substrate. It is contemplated that, in a preferred embodiment, the polymerization preclusion means includes a static, or motionless, mixer.

In a preferred embodiment of the invention, the apparatus further comprises means for regulating a desired amount of electrode paste and polymerization initiator which is to be released from the mixing means and onto the substrate. Regulating means may also be used for regulating the release of desired amounts of electrode paste and polymerization initiator into the mixing means.

Furthermore, means for curing (e.g. an oven) the electrode paste after it has been applied onto the substrate is likewise contemplated. It is also contemplated that the curing occur in at least a two stage process. For example, it may be desirous to only partially cure the electrode paste after it has been applied onto the substrate, and then to more fully cure it at a later stage. Indeed, in one preferred embodiment of the present invention, an electrolyte is mixed with an electrolyte polymerization initiator in a similar fashion as discussed with respect to the electrode paste and polymerization initiator. Inasmuch as an electrolyte typically adheres better to a soft, or partially cured electrode paste, such a multi-step curing of the electrode paste is desirable. Accordingly, after the electrolyte is applied, the electrode paste can then continue on toward yet additional curing.

In a preferred embodiment, the invention further contemplates means for applying a protector, such as an overlay film, over the substrate after the electrode paste has been applied to the substrate, and before exposure to the curing means, so as to preclude excessive exposure of the applied electrode paste to oxygen. The invention further contemplates means for removing volatiles which may exist in the electrode paste prior to polymerization, as well as means for removing water in the electrode paste or polymerization initiator, by use of a dehydrating agent.

The invention includes a process for applying an electrode paste to a substrate wherein the process comprises the steps of a) inserting an electrode paste into a support member; b) inserting a polymerization initiator into a retaining chamber; c) releasing predetermined amounts of the electrode paste and the polymerization initiator, from the support member and retaining chamber, respectively, into a mixing chamber; d) mixing the predetermined amounts of the electrode paste and the polymerization initiator within the mixing chamber; e) releasing the mixed electrode paste and polymerization initiator from the mixing chamber and applying it onto a substrate; and f) initiating polymerization of the electrode paste after it has been released from the mixing chamber and after it has been applied onto the substrate.

In a preferred embodiment of the invention, the process further comprises the step of regulating the amount of the mixed electrode paste and polymerization initiator to be released onto the substrate. The process also comprises the step of curing the electrode paste after the step of applying the electrode paste onto the substrate, by, for example, inserting the substrate with the electrode paste into an oven.

In such a preferred embodiment, the process further comprises the step of applying a protective cover to the substrate after the step of applying the electrode paste onto the substrate and before the step of curing the electrode paste, wherein the protective cover serves to preclude excessive exposure of the electrode paste to oxygen. It is also contemplated that the process includes the steps of: removing volatiles in the electrode paste after the step of applying the electrode paste onto the substrate; and, removing water by use of a dehydrating agent which may be in the electrode paste or polymerization initiator.

It is also contemplated that the process utilize a multi-stage curing procedure, and, that the substrate with the electrode paste continue on in an in-line process for application of an electrolyte and another substrate, such as a lithium anode, toward the total fabrication of a rechargeable lithium battery.

BRIEF DESCRIPTION OF THE DRAWINGS

FIG. 1 is a schematic diagram of the present apparatus; and

FIG. 2 is a schematic diagram of an alternative embodiment of the present apparatus.

BEST MODE FOR CARRYING OUT THE INVENTION

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments so illustrated.

Electrode paste applicator apparatus 10 is shown in FIG. 1 as comprising electrode paste supporting means 22, polymerization initiator retaining means 24, mixing means 26, regulating means 28–30, curing means 32, substrate protector means 34 and volatile removal means 36. Polymerization initiator retaining means 24, which may comprise any commercially available container which will support and enable release of a liquid or gas, releasably retains polymerization initiator 45 and/or a mixture of the polymerization initiator and at least one other component, such as commercially available solvents, polymerization accelerators, polymerization modifiers, dehydrating agents or highly reactive polyfunctional cross-linking monomers, to name a few. In cases of chemical incompatability, sequential applications of such components can be used. The polymerization initiators are also commercially available and are used for initiating the polymerization of electrode paste 40. Examples of a few acceptable polymerization initiators include: peroxides, such as t-butylperoctoate and benzoyl peroxide; and, azo compounds, such as azobisisobutyronitrile.

Electrode paste supporting means 22, is shown as comprising a cylindrical device which forces a predetermined amount of the electrode paste out of the supporting means 22 by a pressurized piston-like member. However, it is contemplated that other conventional retaining and dispensing mechanisms be used, if desired.

Mixing means 26 is used to operatively mix electrode paste 40 and polymerization initiator 45 (along with other desired components, as identified above), prior to application of the mixture onto top surface 50 of substrate 44.

As will be explained, the substrate ("current collector") may comprise a metal foil or mesh, for example, which, after application of the electrode paste thereon, will collectively comprise an electrode 60 for use in, for example, a rechargeable lithium battery.

Mixing means 26 may comprise any suitable mixing device which does not result in excessive heat and/or an excessive conversion of energy (from the mixing device) into heat (in the mixture)—inasmuch as such heat would result in an undesirable premature initiation of the polymerization of the electrode paste; it is also desirable that the mixing means operates in a manner which will not result in the formation of unwanted air/gas bubbles in the mixture. Furthermore, as will be identified below, the electrode paste itself, (even prior to mixing with a polymerization initiator), is initially prepared with acrylic monomers which have been chemically treated to remove otherwise prevalent polymerization inhibitors. As a result, the electrode paste which has been inserted into electrode paste supporting means 22 is quite susceptible to premature gelation if subjected to excessive heat or mechanical energy -thereby, additionally requiring a mixing means in accordance with the above. Mixing devices exhibiting acceptable properties for use in the present invention are generally known as static, or motionless, mixers, and can be commercially obtained from such companies as Cole-Parmer Instrument Company of Niles, Illinois and Chemineer, Inc. of North Andover, Massachusetts.

In operation, electrode paste applicator apparatus 10 is configured to apply an electrode paste, such as electrode paste 40, immediately after it has been mixed with a polymerization initiator, onto metal foil substrate 44 (which, after completion of the claimed and described process will result in a thermally cured electrode 60 for eventual use in an electrolyte cell). While substrate/current collector material 44 is shown in roll form, it will be readily understood to those with ordinary skill in the art, that other means for supplying such material, such as by dispensing pre-cut sheets, among others, are also contemplated.

Electrode paste 40, which has been premixed to a desired consistency (fineness of grind), is inserted into electrode paste supporting means 22 and maintained therein until operable release into mixing means 26. Although numerous variations of electrode pastes may be used for application onto substrate/current collector 44, a typical formula for such an electrode paste would be as follows:

| COMPONENTS | WT % |
| --- | --- |
| Electrode Active Material | 55.0 |
| Carbon Black | 6.0 |
| Graphite | 4.0 |
| Plasticizer(s) | 25.0 |
| Acrylic Monomer(s) | 10.0 |
| | 100.0 |

Prior to insertion in, and/or release of the electrode paste from mixing means 26, polymerization initiator 45 is inserted into polymerization initiator retaining means 24. As previously explained, the polymerization initiator retaining means may also include other desired components as well. For example, it may be desirous to add a dehydrating agent to polymerization initiator 45 prior to mixing with the electrode paste, since it is of particular importance that the electrode paste be substantially devoid of any water content. An example of an acceptable dehydrating agent is dimethoxypropane —although other conventional dehydrating agents which would not adversely affect the chemical composition of polymerization initiator 45 or electrode paste, are likewise contemplated for use.

Specifically, the use of dimethoxypropane as the dehydrating agent (in a preferred embodiment) is particularly desirable inasmuch as it: 1) reacts with water which may be present in the electrode paste, and, in turn, generates methanol and acetone which are rapidly volatilized when exposed to volatilized removal means 36 (as will be explained); and 2) can be used as a solvent/dilutent for the polymerization initiator. Indeed, the use of such a solvent is typically required when the polymerization initiator comprises a solid substance, such as benzoyl peroxide or azobisisobutyronitrile. In addition to the utilization of such identified additives into the polymerization initiator, prior to actual mixing with the electrode paste, it is also contemplated that such other components be added directly into mixing means 26 (as opposed to adding them directly into polymerization retaining means 24) through a separate injection/dispersing system.

Although not shown, it is also contemplated that apparatus 10 include multiple polymerization initiator retaining means, and, in turn, multiple variations of polymerization initiators. Indeed, it may be desirable to use two different types of polymerization initiators which, after mixing with the electrode paste, and after applying the mixed electrode paste onto the substrate, results in a two-stage curing/polymerization process. For example, it is known that electrolytes adhere better to a soft (or partially cured) electrode paste as compared to a hard (or substantially cured) electrode paste. Accordingly, the present invention contemplates that various types of polymerization initiators can be used wherein only partial curing of the electrode paste will occur prior to application of the desired electrolyte thereon (so as to facilitate bonding between the electrolyte and the electrode paste), and then the second stage of the curing process will continue after the application of the electrolyte. Of course, it will be understood that the first stage of such a curing process would provide an electrode paste which is cured at least enough to withstand the mechanical stresses imparted to the applied electrode paste from the various mechanisms and treatments it may be exposed to during the continued fabrication of the finished electrode/substrate, as well as the complete electrolytic cell.

While the use of a multi-stage polymerization initiator has been described as comprising separate polymerization initiators and separate polymerization initiator retaining means, it is also contemplated that a single polymerization initiator be fabricated wherein controlled curing would occur—so that the electrolyte could nonetheless be applied to a soft (partially cured) electrode paste. It is also contemplated that such multi-stage curing occur as a function of exposure of the applied electrode paste to various curing catalysts, in a controlled manner.

After electrode paste 40 and polymerization initiator 45 (and other desired components) have been inserted into their respective supporting/retaining means, predetermined amounts of same are then released into mixing means 26. As shown in FIG. 1, such predetermined amounts will be regulated through regulating means 28 and 29, which, in a preferred embodiment, may comprise conventional gear metering pumps—although other types of conventional regulating devices suitable for use with the various chemicals to be released into the mixing means are also contemplated for use. Additionally, although the actual ratio of polymerization initiator 45 to electrode paste 40 will depend on, for example, the particular chemical composition of same, the amount of polymerization initiator to be used will generally be in the range of 0.05% to 2.0% of the total weight of the particular electrode paste to be used. Actual mixing of the polymerization initiator and electrode paste will commence immediately upon regulated release of same into mixing means 26. Again, as previously explained, mixing means 26 must be constructed to thoroughly mix the polymerization initiator and electrode paste together without subjecting the mixture to unacceptable levels of thermal and mechanical energy which may otherwise be imparted from the mixing device.

Immediately after the electrode paste and polymerization initiator have been operatively mixed, a regulated amount of the mixture is then released (in association with regulating means 30) and applied onto top surface 50 of substrate/current collector material 44. It is contemplated that release and application of the mixture onto the substrate may be accomplished as part of a continuous process (i.e., wherein movement of the substrate material is synchronized with the continuous release of the mixture from the mixing means); that predetermined amounts of the mixture be released and applied onto the substrate in synchronized time increments; or that such release and application of the mixture occur upon sensed locations of the substrate as it travels through the process. Of course, other conventional feeding and material application processes are also contemplated for use, as long as a desired amount of the mixture is applied over a predetermined area and at a predetermined thickness on the substrate.

After the mixture has been operatively applied onto substrate/current collector material 44, polymerization of the applied electrode paste will begin to occur. Indeed, because of the mixing means, and, more particularly, the polymerization preclusion means associated therewith, coupled with the mixing of the polymerization initiator with the electrode paste just prior to application onto substrate/current collector material 44, polymerization will not actually begin to occur until after the mixture has been released from the mixing means, and after it has been applied onto the substrate. Accordingly, premature gelation/polymerization which could otherwise damage the processing equipment, as well as result in the formation of a degraded, chemically disrupted electrode, will be avoided.

As polymerization of the electrode paste on substrate 44 begins to occur, the coated/treated substrate is next exposed to volatile removal means 36. The volatile removal means, which may comprise a conventional heat source, such as a heat gun or other type of heat stream, causes volatiles, such as methanol and acetone, to become vaporized and removed from the electrode paste.

It is also contemplated that after removal of the volatiles, that substrate protector means 34 be layed over the applied electrode paste. The protector means, which may comprise, for example, a plastic film or metal foil (shown in roll form in FIG. 1), is utilized so as to substantially preclude the applied electrode paste from excessive exposure to oxygen. Of course, if the coating were applied under inert atmospheric conditions, such as a nitrogen atmosphere, then the need for a protector would be eliminated.

After the protector means has been operatively positioned over the applied electrode paste, the covered substrate will then be subjected to curing means 32. The curing means serves to promote polymerization of the electrode paste, and may comprise a heat source, such as an oven.

As the coated substrate leaves the curing means, a thermally cured electrode will have been efficiently fabricated. The finished electrode will then, if desired, be used as an electrode in an electrolytic cell. It is also contemplated that actual fabrication and assembly of additional components for such a cell, such as the electrolyte and an anode, in combination with the resultant electrode, be accomplished as part of an in-line process wherein the resultant electrode would continue on, after exiting curing means 32, through and in cooperation with additional integrated components toward such an in-line manufacture of a substantially completed electrolytic cell, and, more particularly, a rechargeable lithium battery.

Specifically, an additional in-line process is shown in FIG. 2 wherein the substrate with the applied electrode paste continues on toward fabrication of an electrolytic cell. Inasmuch as the components and process previously described with respect to the application of the electrode paste in FIG. 1 are also used in the continued in-line process of FIG. 2, the same reference numerals will be used where applicable.

Accordingly, in addition to the previously described process and components for applying an electrode paste 40 to top surface 50 of substrate 44, apparatus 1 0 further includes electrolyte supporting means 62, electrolyte polymerization initiator retaining means 64, combining means 66 (which, in a preferred embodiment comprises a static mixer as previously described), electrolyte 70, electrolyte polymerization initiator 75, thermal source 76 and, treated lithium anode 80. Although a lithium anode has been identified, it will be understood to those with ordinary skill in the art that other types of treated and untreated substrates, including other types of alkali metal anodes, are contemplated for use in the present invention.

In operation, and after substrate 44 has been operatively coated with electrode paste 40 (preferably the electrode paste has been mixed with polymerization initiators which enable a two-stage curing process) and while the electrode paste is still somewhat soft (partially cured), the coated substrate will then further be coated with an electrolyte. As was done with electrode paste 40, predetermined quantities of electrolyte 70 and electrolyte polymerization initiator 75 will be released from electrolyte supporting means 62 and electrolyte polymerization retaining means 64, respectively, and into combining means 76. The combining means, which may comprise a static mixer, mixes the electrolyte and polymerization initiator in such a way so as to avoid polymerization from occurring until after the electrolyte is released from the combining means and after it has been applied onto the electrode paste on the substrate.

After the electrolyte has been operatively applied onto the electrode paste, the electrolyte will then be exposed to thermal source 76, such as an oven or an alternate energy source, such as ultra-violet light. The thermal source will promote curing of the electrolyte and, if desired, could also serve to promote further curing of the electrode paste (if, for example, a multi-stage curing process is used with respect to the electrode paste). It should be noted that a multi-stage curing process is also contemplated for use with respect to the electrolyte.

Following application of the electrolyte, the coated substrate may eventually be covered with a treated lithium anode, for example, toward the total fabrication of an electrolytic cell.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A process for applying an electrode paste to a substrate, comprising the steps of:

inserting an electrode paste into a support member;

inserting a polymerization initiator into a retaining chamber;

releasing regulated amounts of the electrode paste and the polymerization initiator, from the support member and retaining chamber, respectively, into a mixing chamber;

mixing the regulated amounts of the electrode paste and polymerization initiator within the mixing chamber;

releasing the mixed electrode paste and polymerization initiator from the mixing chamber and applying it onto a substrate;

initiating polymerization of the electrode paste after it has been released from the mixing chamber and after it has been applied onto the substrate;

curing the electrode paste after the step of applying the electrode paste onto the substrate; and applying a protective cover to the substrate after the step of applying the electrode paste onto the substrate and before the step of curing the electrode paste, wherein the protective cover serves to preclude excessive exposure of the electrode paste to oxygen.

2. A process for applying an electrode paste to a substrate, comprising the steps of:

inserting an electrode paste into a support member;

inserting a polymerization initiator into a retaining chamber;

releasing regulated amounts of the electrode paste and the polymerization initiator, from the support member and retaining chamber, respectively, into a mixing chamber;

mixing the regulated amounts of the electrode paste and the polymerization initiator within the mixing chamber;

releasing the mixed electrode paste and polymerization initiator from the mixing chamber and applying it onto a substrate;

initiating polymerization of the electrode paste after it has been released from the mixing chamber and after it has been applied onto the substrate; and removing water which may be in the electrode paste or polymerization initiator by addition of a dehydrating agent thereto.

3. A process for applying an electrode paste to a substrate, comprising the steps of:

inserting an electrode paste into a support member;

inserting a polymerization initiator into a retaining chamber;

releasing regulated amounts of the electrode paste and the polymerization initiator, from the support member and retaining chamber, respectively, into a mixing chamber;

mixing the regulated amounts of the electrode paste and the polymerization initiator within the mixing chamber;

releasing the mixed electrode paste and polymerization initiator from the mixing chamber and applying it onto a substrate;

initiating polymerization of the electrode paste after it has been released from the mixing chamber and after it has been applied onto the substrate; and inserting an electrolyte into a support member;

inserting an electrolyte polymerization initiator into a retaining chamber;

releasing regulated amounts of the electrolyte and the electrolyte polymerization initiator, from the electrolyte support member and electrolyte polymerization initiator retaining chamber, respectively, into a mixing chamber;

mixing the regulated amounts of the electrolyte and the electrolyte polymerization initiator within the mixing chamber;

releasing the mixed electrolyte and electrolyte polymerization initiator from the mixing chamber and applying it onto the electrode paste which has been applied onto the substrate; and initiating polymerization of the electrolyte after it has been released from the mixing chamber and after it has been applied onto the electrode paste on the substrate.

4. The process according to claim 3, further comprising the step of curing the electrode paste in at least two separate stages, wherein a first stage of curing would occur prior to the step of applying the electrode paste onto the substrate, so as to result in a partially cured electrode paste, and, at least a second stage of curing would occur after the step of applying the electrolyte onto the partially cured electrode paste.

5. The process according to claim 3 further comprising the step of curing the electrolyte after the step of applying the electrolyte onto the electrode paste on the substrate.

* * * * *